(12) United States Patent
Li

(10) Patent No.: US 11,122,154 B2
(45) Date of Patent: Sep. 14, 2021

(54) MOBILE TERMINAL

(71) Applicants: Zhejiang Geely Holding Group Co., Ltd., Hangzhou (CN); Zhejiang Geely Automobile Research Institute Co., Ltd., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 7 days.

(21) Appl. No.: 16/467,492

(22) PCT Filed: Nov. 10, 2017

(86) PCT No.: PCT/CN2017/110355
§ 371 (c)(1),
(2) Date: Jun. 6, 2019

(87) PCT Pub. No.: WO2018/103497
PCT Pub. Date: Jun. 14, 2018

(65) Prior Publication Data
US 2019/0327350 A1 Oct. 24, 2019

(30) Foreign Application Priority Data
Dec. 7, 2016 (CN) .......................... 201611118370.0

(51) Int. Cl.
*H04M 1/02* (2006.01)
*H04M 1/04* (2006.01)
(Continued)

(52) U.S. Cl.
CPC ........ *H04M 1/0268* (2013.01); *G06F 1/1624* (2013.01); *G06F 1/1643* (2013.01);
(Continued)

(58) Field of Classification Search
CPC .... G06F 1/1624; G06F 1/1643; G06F 1/1652; G06F 1/1686; G06F 1/1613;
(Continued)

(56) References Cited

U.S. PATENT DOCUMENTS

2008/0086925 A1   4/2008  Yang
2008/0304222 A1*  12/2008 Chen ..................... G06F 1/1686
                                                361/679.55
(Continued)

FOREIGN PATENT DOCUMENTS

CN    101163163 A    4/2008
CN    102130981 A    7/2011
(Continued)

*Primary Examiner* — Yuwen Pan
*Assistant Examiner* — Hung K Du
(74) *Attorney, Agent, or Firm* — Cheng-Ju Chiang

(57) ABSTRACT

The mobile terminal provided by the present disclosure includes a terminal body and a control unit. A side of the terminal body is provided with an elongated opening, an inside of the terminal body is rollingly provided with a flexible display screen, the flexible display screen is able to be pulled out the terminal body via the elongated opening, the control unit controls the flexible display screen to display an image. The terminal body of the present disclosure is provided with the flexible display screen which can be set in inside of the terminal body, so that the mobile terminal is small but has a big display screen.

18 Claims, 20 Drawing Sheets

(51) Int. Cl.
  *H04M 1/21* (2006.01)
  *G06F 1/16* (2006.01)
(52) U.S. Cl.
  CPC .......... *G06F 1/1652* (2013.01); *G06F 1/1686* (2013.01); *H04M 1/0264* (2013.01)
(58) Field of Classification Search
  CPC .............. H04M 1/0208; H04M 1/0264; H04M 1/0266; H04M 1/0268; H04M 1/0285; H04M 1/21; H04M 1/66; H04M 1/72519; H04M 1/04
  See application file for complete search history.

(56) References Cited

U.S. PATENT DOCUMENTS

| | | |
|---|---|---|
| 2010/0060548 A1 | 3/2010 | Choi et al. |
| 2013/0127917 A1 | 5/2013 | Kwack et al. |
| 2014/0198036 A1 | 7/2014 | Kim et al. |
| 2015/0370287 A1* | 12/2015 | Ko ........................ G06F 1/1681 361/749 |
| 2016/0191690 A1* | 6/2016 | Park .................. H04M 1/72519 455/566 |
| 2016/0266611 A1 | 9/2016 | Wang et al. |
| 2016/0299531 A1 | 10/2016 | Vertegaal |
| 2017/0013705 A1 | 1/2017 | Jahng |
| 2017/0149171 A1* | 5/2017 | Szeto ..................... H01R 11/30 |
| 2017/0168769 A1* | 6/2017 | Jeon ..................... H04M 1/0268 |
| 2018/0130447 A1* | 5/2018 | Ent ........................ G06F 1/1643 |

FOREIGN PATENT DOCUMENTS

| | | |
|---|---|---|
| CN | 203479257 U | 3/2014 |
| CN | 103941816 A | 7/2014 |
| CN | 203721163 U | 7/2014 |
| CN | 104155830 A | 11/2014 |
| CN | 104683522 A | 6/2015 |
| CN | 104917858 A | 9/2015 |
| CN | 205692150 U | 11/2016 |
| CN | 106302885 A | 1/2017 |
| CN | 106713538 A | 5/2017 |
| CN | 106790883 A | 5/2017 |
| CN | 206195842 U | 5/2017 |
| KR | 10-1638167 B1 | 7/2016 |
| WO | 01/50232 A2 | 7/2001 |

* cited by examiner

MOBILE TERMINAL

CROSS-REFERENCE TO RELATED APPLICATION

The present application is a 35 U.S.C. § 371 National Phase conversion of International (PCT) Patent Application No. PCT/CN2017/110355, filed on Nov. 10, 2017, which is based on and claims priority of Chinese patent application No. 201611118370.0, filed on Dec. 7, 2016. The entire disclosure of the above-identified application is hereby incorporated by reference herein and made a part of this specification. The PCT International Patent Application was filed and published in English.

TECHNICAL FIELD

The present disclosure relates to the field of electronic devices, and more particularly to a mobile terminal.

BACKGROUND ART

Mobile phones and other mobile terminals are one of the equipment that people in today's society cannot be separated therefrom. In order to improve the convenience of mobile phones, mobile phones are getting smaller and thinner but still cannot meet the needs of the people. For example, the mobile phone generally uses the LED flash lamp as a flashlight, but the LED flash lamp is originally designed for compensating the light while photographing and the light is generally scattered light and cannot be converged, thus, the irradiation distance is short. Also, when people in a meeting, they usually need to use a laser pointer or a page-turning laser pointer. If user forgot to bring one, the user may feel inconvenient and the effect of PPT demonstration may be affected. In addition, sometimes people may want to quickly know the distance between two objects but without a tape with them, thus, it will be a great convenience to the people if the mobile phone has a distance-measuring function.

Technical Solution

Therefore, the present disclosure provides a mobile terminal which is small but has a big display screen.

A embodiment provides of the present disclosure provides a mobile terminal, wherein the mobile terminal includes a terminal body and a control unit, a side of the terminal body is provided with an elongated opening, an inside of the terminal body is rollingly provided with a flexible display screen, the flexible display screen is able to be pulled out the terminal body via the elongated opening, the control unit controls the flexible display screen to display an image.

Further, the mobile terminal is a pen-like structure.

Further, the flexible display screen is able to be positioned at any position in a stepless manner.

Further, a free end of the flexible display screen is provided with a long barrier strip, a length of the barrier strip is greater than a length of the elongated opening.

Further, the mobile terminal further includes a sensing unit, the sensing unit comprises a deformation sensing unit, and the deformation sensing unit senses deformation information of different parts of the flexible display screen and determines a length of a pulled-out part of the flexible display screen according to a change of the deformation information of the flexible display screen, wherein the control unit is further configured to automatically calculate a size of the image that the flexible display screen display based on the length of the pulled-out part of the flexible display screen and accordingly adjust a display ratio of the image displayed on the flexible display screen.

Further, an other side of the terminal body is provided with a transparent display screen, the elongated opening is set on an adjacent side of the transparent display screen, the transparent display screen of the terminal body is provided with a polymer dispersion liquid crystal layer, the polymer dispersion liquid crystal layer is configured to change its transparency by changing the electrical signal applied thereto, wherein the control unit is further configured to control the polymer dispersion liquid crystal layer to turn the transparent display screen into opacity when the flexible display screen is pulled out the terminal body.

Further, a front surface of the terminal body is provided with a camera, wherein the control unit is further configured to control the flexible display screen to normally display an image captured by the camera, and when the camera is used for photographing, the control unit is further configured to control the flexible display screen to invertly display the image captured by the camera.

Further, a back surface of the terminal body is provided with a camera, wherein the control unit is further configured to control the flexible display screen to normally display an image captured by the camera, and when the camera is used for photographing, the control unit is further configured to control the flexible display screen to invertly display the image captured by the camera.

Further, a bottom surface of the terminal body is provided with a photographing-illumination module, the photographing-illumination module includes a camera, a flash lamp and a switch wheel, wherein the camera is located in a center of the switch wheel, and the flash lamp is located on a side of the camera and is able to be aligned with flash lenses provided in the circumferential direction of the switch wheel.

Further, the flash lenses comprise planar lenses and convex lenses, wherein by rotating the switch wheel, the flash lamp is configured to be engaged with different flash lenses so that the flash lamp is able to be used as a normal flash or as a flashlight or as a laser pointer.

Further, the flash lenses are telescopic zoom lenses, and each of the telescopic zoom lens changes the divergence or convergence effect of the flash lens on the light of the flash lamp through a expansion and contraction of a lens barrel, so that the flash lamp is able to be used as a normal flash and is also able to be used as a flashlight with adjustable irradiation distance.

Further, the photographing-illumination module includes a laser lamp, the laser lamp is located on a side of the camera and is configured to be aligned with the flash lenses provided in the circumferential direction of the switch wheel.

Further, wherein the control unit is further configured to control the laser lamp to emit light and control the camera to capture an image of an illuminated object, and calculate distance between the camera and the illuminated object according to distance between a bright spot and an image center in a captured image.

Further, a front surface and a back surface of the flexible display screen are both provided with a touch sensing layer, wherein the control unite is further configured to activate a corresponding touch sensing layer according to different control signals, the different control signals includes control signals generated according to a specific gesture input on different touch sensing layers and/or control signals generated according to a function of a specific element within the mobile terminal.

Further, when the different control signals includes the control signals generated according to the specific gesture input on the different touch sensing layers and the control signals generated according to the function of the specific element within the mobile terminal, a control priority of the control signals generated according to the function of the specific element within the mobile terminal is higher than the control signals generated according to the specific gesture input on the different touch sensing layers.

Further, a front surface of the flexible display screen and a back surface of the flexible display screen are both provided with a touch sensing layer, wherein the control unit is further configured to activate the touch sensitive layer on the front surface of the flexible display screen by default, and activate the touch sensing layer on the back surface of the flexible display screen and simultaneously deactivate the touch sensing layer on the front surface of the flexible display screen when a activation signal from the back surface of the flexible display screen is received.

Further, an other side of the terminal body is provided with a display screen, the elongated opening is set on an adjacent side of the display screen, wherein the control unit is further configured to control the display screen to display function or information that does not require a large image display area when the flexible display screen is completely rolled into the terminal body.

Further, a front surface of the display screen is provided with a touch sensing layer, wherein the control unite is further configured to control the mobile terminal to perform corresponding operation according to a specific gesture input on the touch sensing layer of the front surface of the display screen.

Further, a top surface or a bottom surface of the mobile terminal is provided with a data-power supply interface, the data-power supply interface is for connecting an external device.

Further, wherein the mobile terminal and the external device are connected in a clip connection, a magnetic force or a screw connection manner.

Further, wherein the control unit is further configured to issue confirmation information to a user according to a connection request issued by the external device to confirm whether or not it is necessary to connect the external device and to issue a connection signal to a corresponding control module after the user confirms or to directly issue the connection signal to the corresponding control module in response to the connection request, thereby allowing the control module to be connected to the external device.

Further, wherein a support body rotatable relative to the mobile terminal is provided at a position on a side surface of the mobile terminal and adjacent to the data-power supply interface, and the support body is fixed to the mobile terminal by a pivot shaft and is able to be positioned at any angle in a stepless manner.

The terminal body of the present disclosure is provided with the flexible display screen which can be set in inside of the terminal body, so that the mobile terminal is small but has the big display screen. In addition, the photographing-illumination module of the present disclosure is provided with flash lenses, thus the flash lamp is able to be used as a normal flash and is also able to be used as a flashlight with far irradiation distance, further the flash lamp is able to be used as the flashlight, laser pointer, a page-turning laser pointer, a distance-measuring device with adjustable irradiation distance.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure. The accompanying drawings are included to provide a further understanding of the disclosure, and are incorporated in and constitute a part of this specification. The drawings illustrate embodiments of the disclosure and, together with the description, serve to explain the principles of the disclosure.

BEST MODE

In order to further elucidate the technical means and efficacy of the present disclosure for achieving the intended purpose of the disclosure, the present disclosure will be described in more detail with reference to the accompanying drawings and preferred embodiments as follow.

First Embodiment

The mobile terminal of the present disclosure may be a mobile phone, a power bank, an MP 3, an MP4, or the like. The mobile terminal of the present disclosure will be described below by using a mobile phone as an example.

Figure 1:
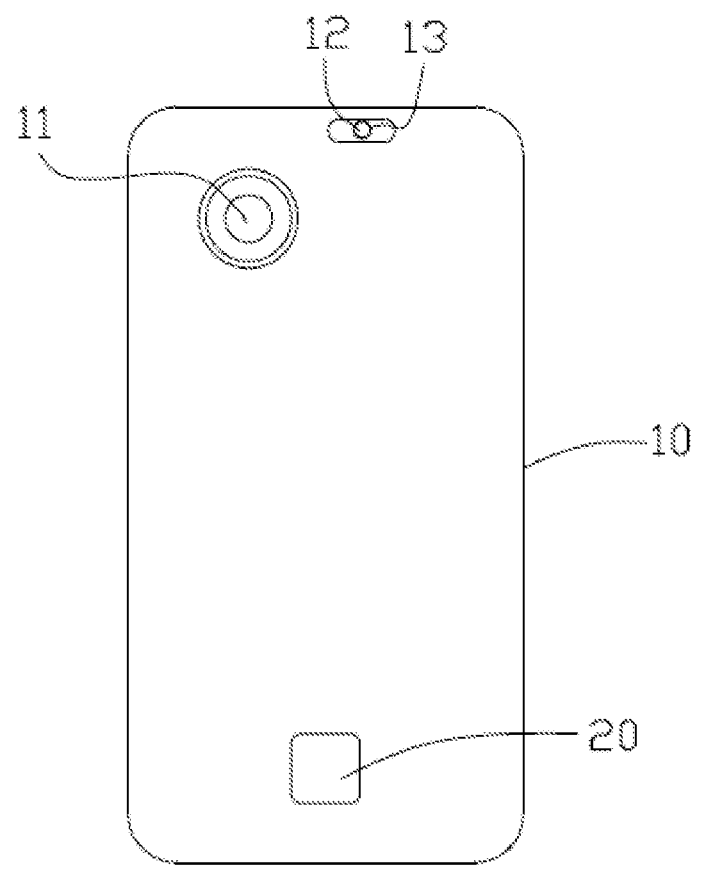
FIG. 1 is a schematic structural view of a first embodiment of the mobile terminal of the present disclosure.

The mobile terminal of the present disclosure includes a terminal body 10 and a control unit 20. As shown in FIG. 1, the terminal body 10 of the present embodiment is a flat cuboid. The front surface of the terminal body 10 is provided with a display screen (not shown), and the back surface of the terminal body 10 is provided with a camera 11, a flash lamp 12 and a zoom lens 13.

Wherein, the camera 11 is a normal rear camera. The flash lamp 12 is a normal flash lamp that compensates the light when photographing, and the light emitted from the flash lamp 12 is a scattered light. In the present embodiment, the flash lamp 12 is an LED lamp.

The control unit 20 is configured to adjust the lighting mode of the flash lamp 12 according to an input command (e.g., a user's touch operation or key operation, etc.) so that the flash lamp 12 can be switched between a flash mode and a flashlight mode. When the flash lamp 12 is in the flash mode, the control unit 20 may control the flash lamp 12 to forcibly flash according to the user's settings while photographing, or control the flash lamp 12 to automatically flash according to the intensity of the surrounding light when the ambient light is dark, thereby activating the effect of photographing light compensation. When the flash lamp 12 is in the flashlight mode, the control unit 20 controls the flash lamp 12 to continuously emit light, thereby activating the effect of continuous illuminating object.

The zoom lens 13 is provided behind the flash lamp 12 in the advancing direction of the light of the flash lamp 12 and covers the flash lamp 12 for converging or diverging the light emitted from the flash lamp 12. In the present disclosure, the zoom lens 13 may be a normal telescopic zoom lens or a flexible zoom lens having a plurality of operating states. When the zoom lens 13 is a normal telescopic zoom lens, the zoom lens 13 is in a different operating state when the lens barrel of the telescopic zoom lens is at a different length. The length of the lens barrel of the telescopic zoom lens and the lens focal length need to satisfy: by adjusting the distance between the zoom lens 13 and the flash lamp 12, the divergence or convergence effect of the zoom lens 13 on the light of the flash lamp 12 can be changed so that the flash lamp 12 can be used as a normal flash or as a flashlight with adjustable irradiation distance. Specifically, the zoom lens 13 activates a divergent effect on the light when the flash lamp 12 is used as a normal flash; alternatively, the zoom lens 13 activates a convergence effect on the light when the flash lamp 12 is used as a flashlight. The convergence effect of the zoom lens 13 on the light can be adjusted by adjusting the length of the lens barrel, so that the irradiation distance of the flashlight is adjustable; that is, the flashlight can have a near light mode and a far light mode. The irradiation range of the light is relatively large when the flashlight is in the near light mode. The light irradiation range of the light is relatively small when the flashlight is in the far light mode. That is, the convergence effect of the zoom lens 13 on the light of the flash lamp 12 in the near light mode is weaker than that of the zoom lens 13 in the far light mode. In addition, it is to be noted that in the present embodiment, the expansion and contraction of the lens barrel can be adjusted by rotating the barrel in the circumferential direction or by pushing or pulling the lens barrel in the axial direction, and the adjustment can be a manual adjustment or an automatic adjustment.

When the zoom lens 13 is a flexible zoom lens, the effect of the zoom lens 13 on the light emitted from the flash lamp 12 can be changed by changing the focal length of the zoom lens 13 through modulating the amount of deformation of the flexible transmission film. The flexible zoom lens has a different operating state when having a different focal length. The focal length variation of the flexible zoom lens needs to satisfy: the flash lamp 12 can be used as a normal flash or as a flashlight with an adjustable irradiation distance. Specifically, when the flash lamp 12 is used as a normal flash, the zoom lens 13 may be used only as a planar lens to have a light transmission effect or have a divergence effect on the light to further diverge the light emitted from the flash lamp 12. The convergence effect of the zoom lens 13 on the light can be adjusted by adjusting the focal length of the zoom lens 13, so that the irradiation distance of the flashlight is adjustable.

From the above description, it is to be understood that the mobile terminal of the present embodiment is provided with a zoom lens 13 behind the flash lamp 12, and the flash lamp 12 can be used as a normal flash or as a flashlight with adjustable irradiation distance by changing the convergence or divergence effect of the zoom lens 13 on the light of the flash lamp 12.

Second Embodiment

Figure 2:
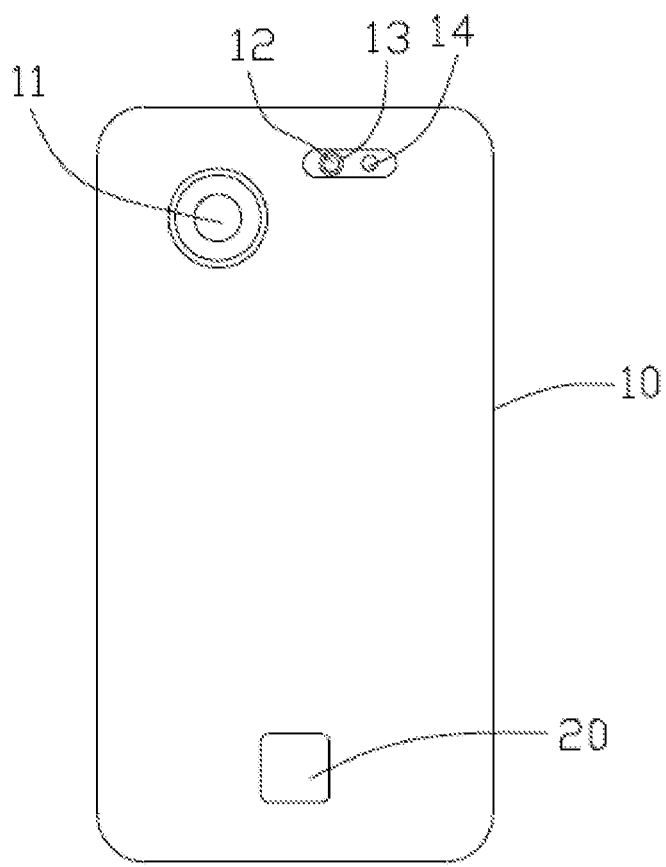
FIG. 2 is a schematic structural view of a second embodiment of the mobile terminal of the present disclosure.

FIG. 2 is a schematic structural view of a second embodiment of the mobile terminal of the present disclosure. As shown in FIG. 2, the mobile terminal of the present embodiment is substantially the same as the mobile terminal of the first embodiment. The mobile terminal of the present embodiment also includes a terminal body 10 and a control unit 20 which are substantially the same as those of the first embodiment. The back surface of the terminal body 10 is also provided with a camera 11, a flash lamp 12 and a zoom lens 13 which are substantially the same as those of the first embodiment. The present embodiment is different from the first embodiment in that the back surface of the terminal body 10 is further provided with a laser lamp 14. In the present embodiment, the laser lamp 14 is a solid-state laser LED, and the light emitted by the laser lamp 14 can be irradiated onto an object to form a small-sized bright spot. The laser lamp 14 is provided on one side of the flash lamp 12 and is disposed side by side with the flash lamp 12 in the width direction of the terminal body 10. Of course, in the present disclosure, the position of the laser lamp 14 is not limited to the above description, and the laser lamp 14 may be provided at other positions of the terminal body 10, for example, at the top of the terminal body 10 in the thickness direction of the terminal body 10.

In the present embodiment, the mobile terminal may be configured to have a laser pointer function, and accordingly the control unit 20 is further configured to excite the laser lamp 14 to emit light according to an input command (e.g., a user's touch operation or a key operation). Thus, the user can turn on the laser pointer function when displaying a presentation document (e.g., PPT) by using an electronic device such as a computer and use the laser pointer to emphasize and indicate some of the contents of the displayed page.

In the present embodiment, the mobile terminal may also be configured to have a page-turning laser pointer function, and accordingly the control unit 20 is further configured to excite the laser lamp 14 to emit light according to an input command (e.g., a user's touch operation or a key operation) and control the display screen of the mobile terminal to display a page-turning key and a display key or use the volume key on the side surface of the mobile terminal as the page-turning key and use the power key as the display key while the laser lamp 14 is emitting light, so that the user can operate an electronic device such as a computer paired with the mobile terminal and control the electronic device to display a presentation document by the mobile terminal. The mobile terminal and the electronic device can be paired through Bluetooth, Wi-Fi, etc.

In addition, in the embodiment in which the laser lamp 14 is provided on the back surface of the terminal body 10 and arranged side by side with the flash lamp 12 in the width direction of the terminal body 10, the mobile terminal may also be configured to have a distance-measuring function, and accordingly the control unit 20 is further configured to turn on the distance-measuring function according to an input command (e.g., a user's touch operation or a key operation), excite the laser lamp 14 to emit light to illuminate the object when the distance-measuring function is turned on, simultaneously control the camera 11 to capture an image of the illuminated object, and calculate the distance between the camera 11 and the object according to the distance between the bright spot and the image center in the captured image.

Figure 3:
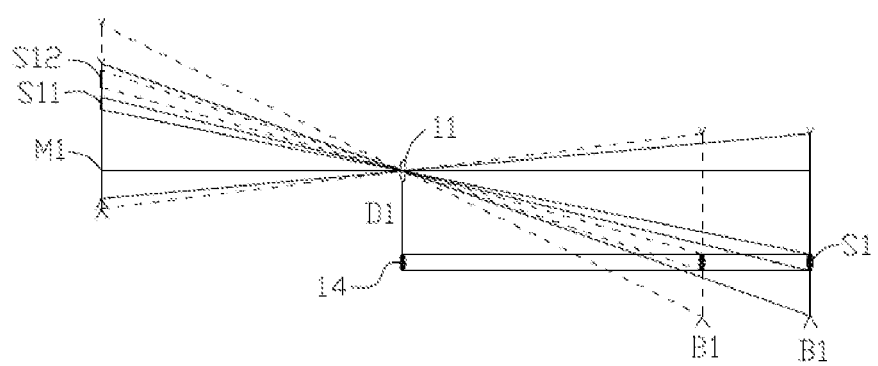
FIG. 3 is a schematic diagram showing a principle of using a laser lamp to measure a distance in the second embodiment of the mobile terminal of the present disclosure.

The principle of using the laser lamp 14 to measure a distance is shown in FIG. 3. Since the distance between the center of the camera 11 and the laser lamp 14 is constant and the light emitted from the laser lamp 14 can be considered to be irradiated on the object in a straight line direction, therefore, the distance between the center of the bright spot in the imaging graphic and the image center also changes when the distance between the object and the camera 11 changes. By pre-calibration, the correspondence between the distance between the center of the bright spot in the imaging graphic and the image center and the distance between the object and the camera 11 is obtained, so that the distance between the object and the camera 11 can be obtained according to the distance between the center of the bright spot in the imaging graphic and the image center.

Specifically, in FIG. 3, since the distance D1 between the center of the camera 11 and the laser lamp 14 is constant and the light emitted from the laser lamp 14 is irradiated onto the object B1 in a straight line direction, therefore, the position of the bright spot 51 on the object B1 is not changed b when the object B1 is parallelly moved closer to the camera 11. However, since the object B1 is moved closer to the camera 11, the bright spot S12 is further away from the image center M1 than the center of the bright spot S11 in the imaging graphic. By pre-calibration, the correspondence between the distance between the center of the bright spots S11, S12 in the imaging graphic and the image center M1 and the distance between the object B1 and the camera 11 is obtained, so that the distance between the object B1 and the camera 11 can be obtained according to the distance between the center of the bright spots S11, S12 in the imaging graphic and the image center M1.

In summary, by being provided with a laser lamp 14 and correspondingly configuring the control unit 20, the mobile terminal of the present embodiment can be used as a laser pointer, a page-turning laser pointer and/or a distance-measuring device in addition to be used as a normal flash and a flashlight having an adjustable irradiation distance.

Third Embodiment

Figure 4:
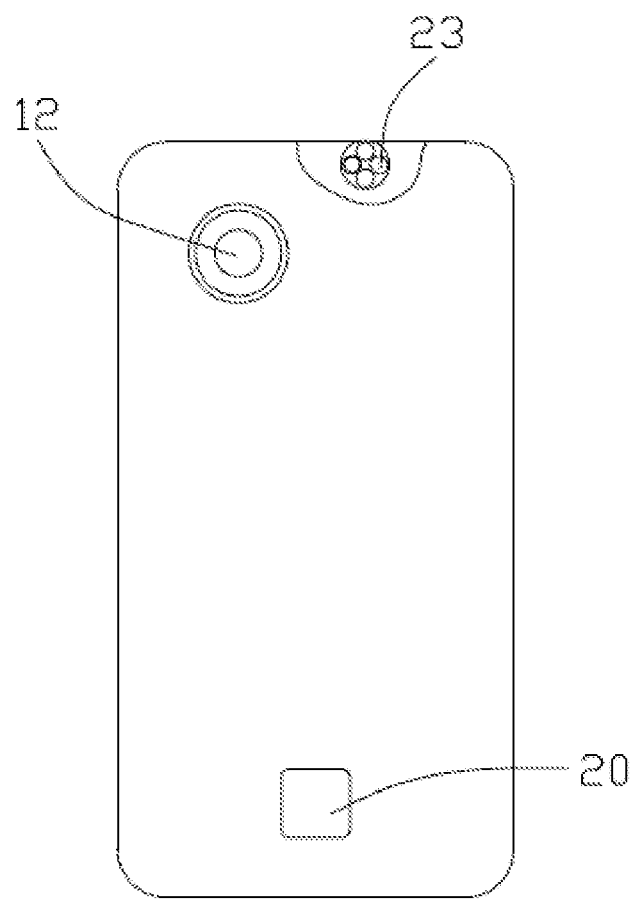
FIG. 4 is a schematic structural view of a third embodiment of the mobile terminal of the present disclosure.
Figure 5:
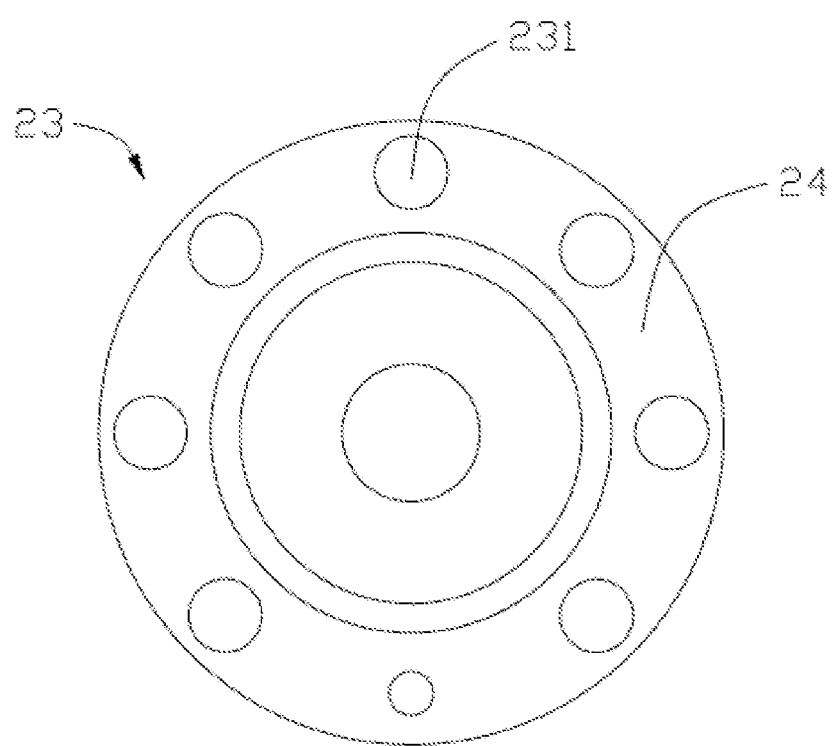
FIG. 5 is a schematic structural view of a switch wheel in the third embodiment of the mobile terminal of the present disclosure.

FIG. 4 is a schematic structural view of a third embodiment of the mobile terminal of the present disclosure. As shown in FIG. 4, the mobile terminal of the present embodiment is substantially the same as the mobile terminal of the first embodiment. The mobile terminal of the present embodiment also includes a terminal body 10 and a control unit 20 which are substantially the same as those of the first embodiment. The back surface of the terminal body 10 is also provided with a camera 11, a flash lamp 12 and a zoom lens 23. Please also refer to FIG. 5. The present embodiment is different from the first embodiment in that the zoom lens 23 in the present embodiment is a disc-shaped zoom lens. The disc-shaped zoom lens includes a switch wheel 24 and a plurality of flash lenses 231 provided on the switch wheel 24. The flash lenses 231 are uniformly distributed in a plurality of flash transmission holes provided in the circumferential direction of the switch wheel 24 in a one-to-one correspondence. The flash lenses 231 may include planar lenses, convex lenses, normal colorless lenses or color lenses such as a red lens, wherein the convex lenses of the flash lenses 231 have different focal lengths. When the switch wheel 24 is rotated, the flash lenses 231 may be rotated to and aligned with the position of the flash lamp 12. That is, by rotating the switch wheel 24, the flash lamp 12 can be engaged with a different lens so that the flash lamp 12 can be used as a normal flash or as a flashlight or as a laser pointer. When the flash lamp 12 is aligned with a planar lens, the lens only transmits the light and the flash lamp 12 can be used as a normal flash. When the flash lamp 12 is located within the focal length of the corresponding lens, the lens has a divergence effect on the light to further diverge the light emitted by the flash lamp 12 and the flash lamp 12 can also be used as a normal flash. When the flash lamp 12 is located outside the focal point or focal length of the lens, the lens has a convergence effect on the light and the flash lamp 12 can be used as a flashlight or a laser pointer, and the irradiation distance of the flashlight can be adjusted by switching the lens. When the flash lamp 12 is used as a laser pointer, the flash lens 231 aligned with the flash lamp 12 is preferably a red lens. Further, the area of the bright spot generated when the flash lamp 12 is used as a laser pointer may be larger than the area of the bright spot emitted from a normal laser pointer due to the effect of the lens convergence effect.

When the flash lamp 12 is used as a laser pointer, the mobile terminal may be configured to have a laser pointer function, a page-turning laser pointer function or a distance-measuring function. The control unit 20 may be configured according to the function that the mobile terminal has. The specific configuration may be referred to the corresponding part of the second embodiment, and no redundant detail is to be given herein.

Fourth Embodiment

The mobile terminal of the present embodiment is substantially the same as the mobile terminal of the second embodiment. The mobile terminal of the present embodiment also includes a terminal body 10 and a control unit 20 which are substantially the same as those of the second embodiment. Similar to the second embodiment, the back surface of the terminal body 10 is also provided with a camera 11, a flash lamp 12 and a laser lamp 14 which are substantially the same as those of the second embodiment. Please also refer to FIG. 6. The present embodiment is different from the second embodiment in that the back surface of the terminal body 10 is further provided with a disc-shaped zoom lens 33. The disc-shaped zoom lens 33 includes a switch wheel 34. The switch wheel 34 is provided behind the flash lamp 12 and the laser lamp 14, and the parts of the switch wheel 34 corresponding to the flash lamp 12 and the laser lamp 14 are provided with a flash transmission hole 341 and a laser transmission hole 342. In the present embodiment, the flash transmission hole 341 and the laser transmission hole 342 are provided with a flash lens 343 and a laser lens 344, respectively. In other embodiments, the laser lens 344 may not be provided in the laser transmission hole 342 so that the light emitted from the laser lamp 14 passes directly through the laser transmission hole 342. The flash lens 343 may be a zoom lens and the laser lens 344 may be a planar lens. In the present embodiment, the flash lens 343 is a normal telescopic zoom lens which can adjust the distance between the lens and the flash lamp 12 by the expansion and contraction of the lens barrel, thereby changing the divergence or convergence effect of the zoom lens 13 on the light of the flash lamp 12 so that the flash lamp 12 can be used as a normal flash or as a flashlight with adjustable irradiation distance. In the present embodiment, the center of the switch wheel 34 may be located at the midpoint of the center of the flash lamp 12 and the center of the laser lamp 14, or may be located at a position slightly lower relative to the flash lamp 12 and the laser lamp 14. The switch wheel 34 may be configured as nonrotatable when the center of the switch wheel 34 is located at the midpoint of the center of the flash lamp 12 and the center of the laser lamp 14. The switch wheel 34 is configured as rotatable about its center when the switch wheel 34 is located at a position slightly lower relative to the flash lamp 12 and the laser lamp 14.

The switch wheel 34 can be rotated to align the flash lens 343 with the flash lamp 12 when the flash function or the flashlight function of the mobile terminal in the present embodiment is needed, and the length of the lens barrel of the flash lens 343 is adjusted according to the desired function, thus, the flash lamp 12 can be used as a normal flash or as a flashlight with adjustable irradiation distance. When the laser pointer function, the page-turning laser pointer function or the distance-measuring function of the mobile terminal in the present embodiment is needed, the switch wheel 34 can be rotated to align the laser transmission hole 342 with the laser lamp 14, and thus, the corresponding function is achieved by the corresponding user operation.

Fifth Embodiment

Figure 7:
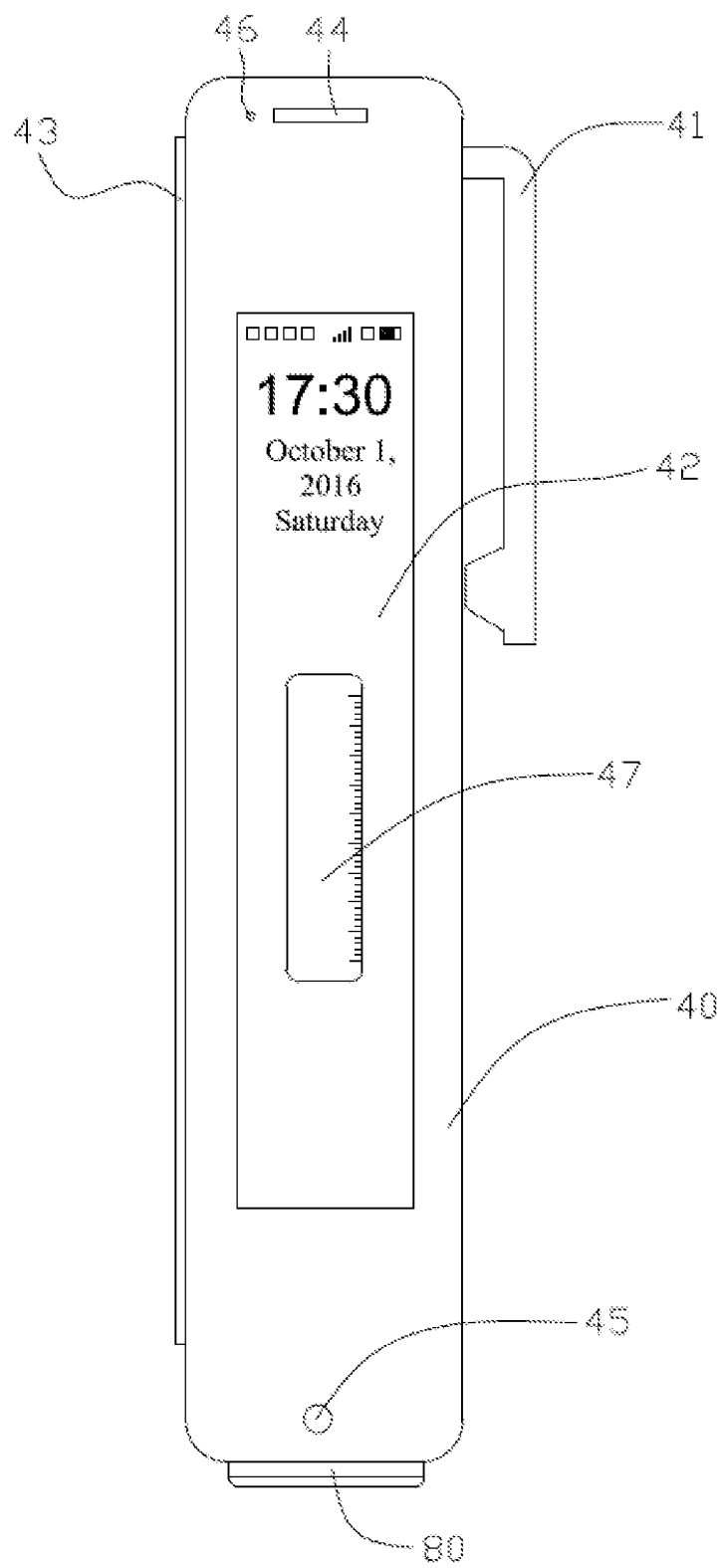
FIG. 7 is a schematic front structural view of a fifth embodiment of the mobile terminal of the present disclosure.
Figure 8:
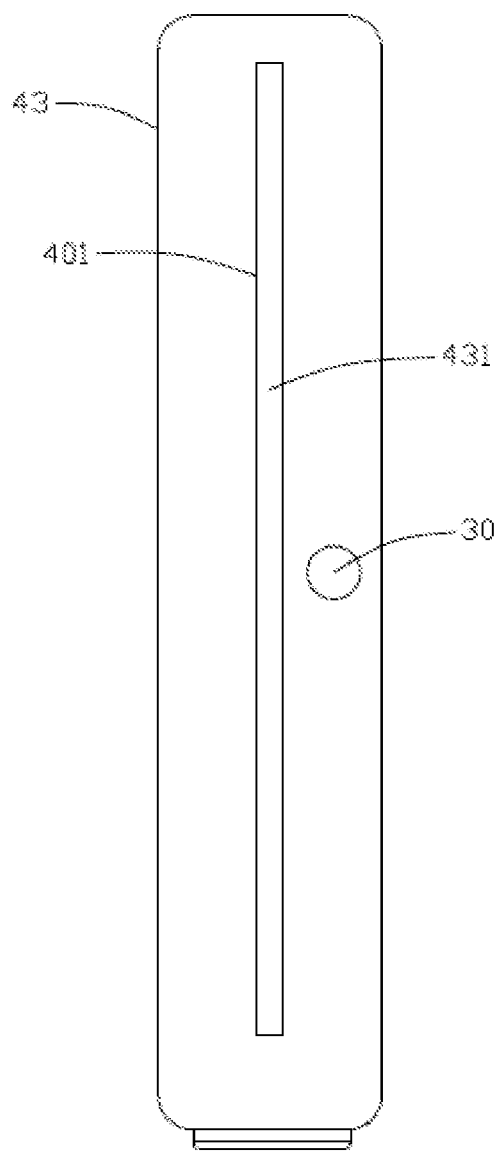
FIG. 8 is a schematic side structural view of a fifth embodiment of the mobile terminal of the present disclosure.

FIG. 7 is a schematic front structural view of a fifth embodiment of the mobile terminal of the present disclosure. FIG. 8 is a schematic side structural view of a fifth embodiment of the mobile terminal of the present disclosure. As shown in FIG. 7 and FIG. 8, the mobile terminal of the fifth embodiment is different from the mobile terminal of the first embodiment in that the mobile terminal of the fifth embodiment is a pen-like structure. Specifically, the pen-like structure is an elongated columnar body including a terminal body 40 and a clip 41 provided on one side of the terminal body 40. A display screen 42 is provided on the side of the terminal body 40 adjacent to the clip 41. The display screen 42 may be a transparent display screen, an opaque display screen, a liquid crystal display screen, an LED display screen or an OLED display screen. The side of the terminal body 40 opposite to the clip 41 is provided with an elongated opening 401 extending in the length direction of the terminal body 40. The inside of the terminal body 40 is rollingly provided with a flexible display screen 43. The flexible display screen 43 may pull out the terminal body 40 via the elongated opening and have a stepless position; that is, when a pull-out action is stopped, the flexible display screen 43 can be positioned at any position according to the length of the pull-out action. In addition, in order to prevent the flexible display screen 43 from falling into the inside of the terminal body 40 and cannot be pulled out from it, the free end of the flexible display screen 43 is provided with a long barrier strip 431. The length of the barrier strip is greater than the length of the elongated opening; therefore, when the flexible display screen 43 is completely rolled into the inside of the terminal body 40, the barrier strip can be abutted against the terminal body 40 at both ends of the elongated opening to prevent the flexible display screen 43 from falling into the inside of the terminal body 40.

Figure 9:
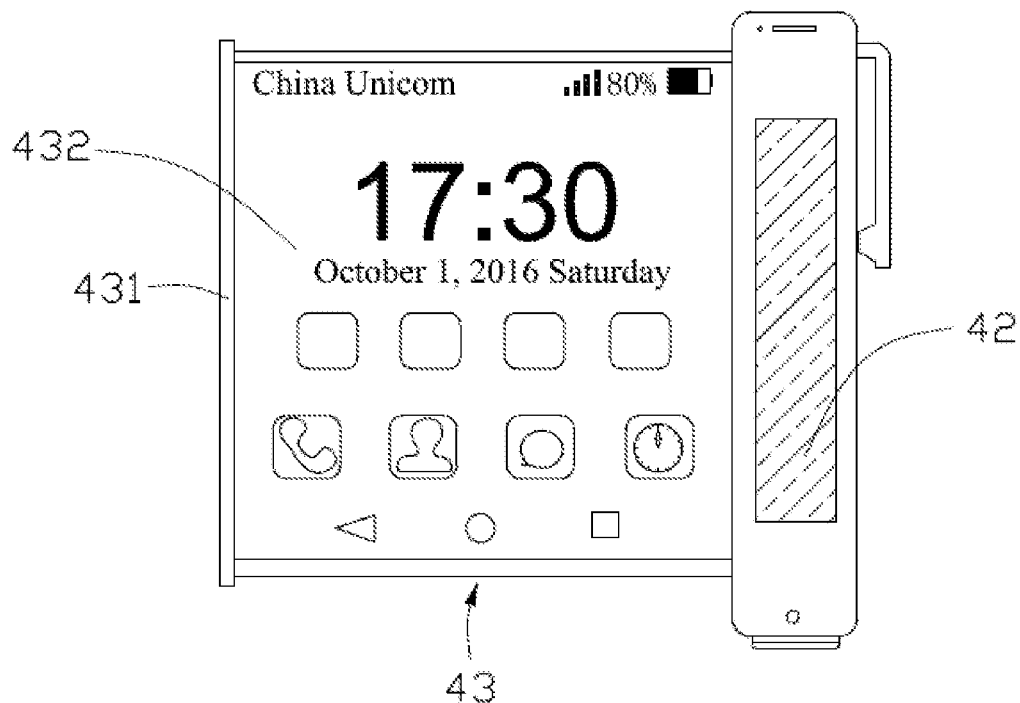
FIG. 9 is a schematic view showing a display state of a mobile terminal when a flexible display screen is pulled out of a first length in the fifth embodiment of the mobile terminal of the present disclosure.
Figure 10:
FIG. 10 is a schematic view showing a display state of a mobile terminal when a flexible display screen is pulled out of a second length in the fifth embodiment of the mobile terminal of the present disclosure.

Further, in order to sense the length of the pulled-out part of the flexible display screen 43, the mobile terminal of the fifth embodiment further includes a sensing unit 30. The sensing unit 30 may include a deformation sensing unit. The deformation sensing unit may sense the deformation information of the different parts of the flexible display screen 43 and determine the length of the pulled-out part of the flexible display screen 43 according to the change of the deformation information of the flexible display screen 43. The control unit may be further configured to automatically calculate the size of an image that the flexible display screen 43 can display based on the length of the pulled-out part of the flexible display screen 43 and accordingly adjust the display ratio of the image displayed on the flexible display screen 43, as shown in FIGS. 9 and 10.

Figure 11:
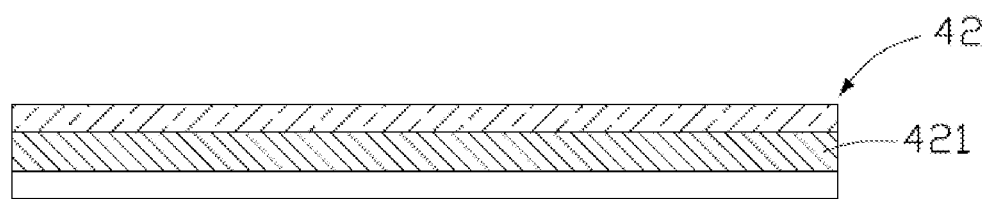
FIG. 11 is a schematic diagram of section structure view of the fifth embodiment of the mobile terminal of the present disclosure.

FIG. 11 is a schematic diagram of section structure view of the fifth embodiment of the mobile terminal of the present disclosure. As shown in FIG. 11, further, when the display screen 42 is a transparent display screen, the display screen 42 of the terminal body 40 is provided with a polymer dispersion liquid crystal (PDLC) layer 421. The polymer dispersion liquid crystal layer 421 can change its transparency by changing the electrical signal applied thereto. As shown in FIGS. 9 and 10, the control unit may be further configured to control the polymer dispersion liquid crystal layer to turn the transparent display screen 42 into opacity when it is learned that the flexible display screen 43 is pulled out the terminal body 40 based on the information transmitted from the sensing unit. The front surface of the display screen 42 of the terminal body 40 may also have a touch sensing layer. The control unit is further configured to control the mobile terminal to perform the corresponding operation according to the gesture input on the touch sensing layer.

Further, referring to FIG. 7, the front top end of the terminal body 40 (i.e., one end of the terminal body 40 provided with the display screen 42 and adjacent to one end of the clip 41) is provided with an earpiece 44 and the front bottom end of the terminal body 40 is provided with a microphone 45. A camera 46 is provided on one side of the earpiece 44. The camera 46 is a front camera and can be used for video call or for photographing. When the camera 46 is used for video call or for photographing, it is necessary to pull the flexible display screen 43 out of the terminal body 40 and display the image captured by the camera 46 with the flexible display screen 43. When the camera 46 is used for video call, the control unit is further configured to control the flexible display screen 43 to normally display the image captured by the camera 46. When the camera 46 is used for photographing, the control unit needs to be further configured to control the flexible display screen 43 to invertly display the image captured by the camera 46 since it is necessary to turn the terminal body 40 front to back to focus the objected to be photographed.

Figure 12:
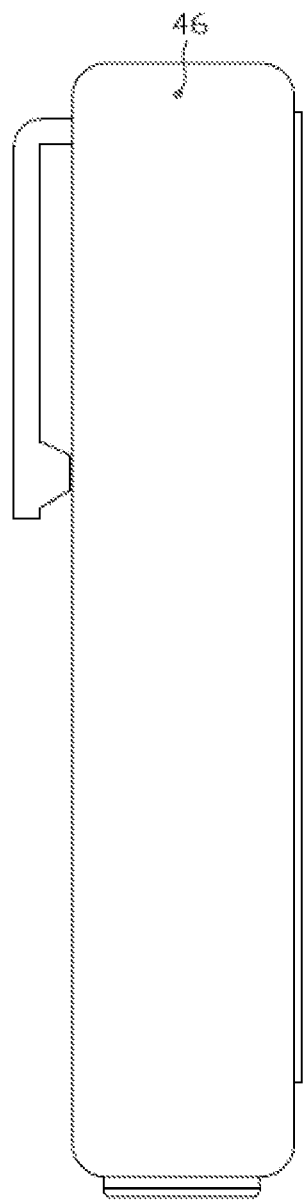
FIG. 12 is a schematic back structural view of the fifth embodiment of the mobile terminal of the present disclosure.

It is to be understood that the camera 46 may be provided on the back top end of the terminal body 40 in other embodiments of the present disclosure as shown in FIG. 12, that is, the camera 46 is a rear camera and the camera 46 can also be used for video call and photographing. When the camera 46 is used for video call, the control unit needs to be further configured to control the flexible display screen 43 to invertly display the image captured by the camera 46. When the camera 46 is used for photographing, the control unit needs to be further configured to control the flexible display screen 43 to normally display the image captured by the camera 46.

Further, as shown in FIG. 7, the bottom surface of the terminal body 40 may be provided with a photographing-illumination module 80. The structure of the photographing-illumination module 80 may be similar to that shown in FIG. 5 or may be similar to that shown in FIG. 6. When the structure of the photographing-illumination module 80 is similar to that of FIG. 5, the photographing-illumination module 80 includes a camera, a flash lamp and a switch wheel. The camera is located in the center of the switch wheel, and the flash lamp is located on the side of the camera and can be aligned with the flash lenses provided in the circumferential direction of the switch wheel. The flash lenses provided on the switch wheel may include planar lenses and convex lenses. The planar lenses and convex lenses may be a colorless lens or a color lens such as a red lens. By rotating the switch wheel, the flash lamp can be engaged with a different lens so that the flash lamp can be used as a normal flash or as a flashlight or as a laser pointer. When the flash lamp is used as a laser pointer, the flash lens aligned with the flash lamp is preferably a red lens. When the flash lamp is used as a laser pointer, the mobile terminal may be configured to have a function such as a laser pointer, a page-turning laser pointer, and/or a distance-measuring device.

Figure 6:
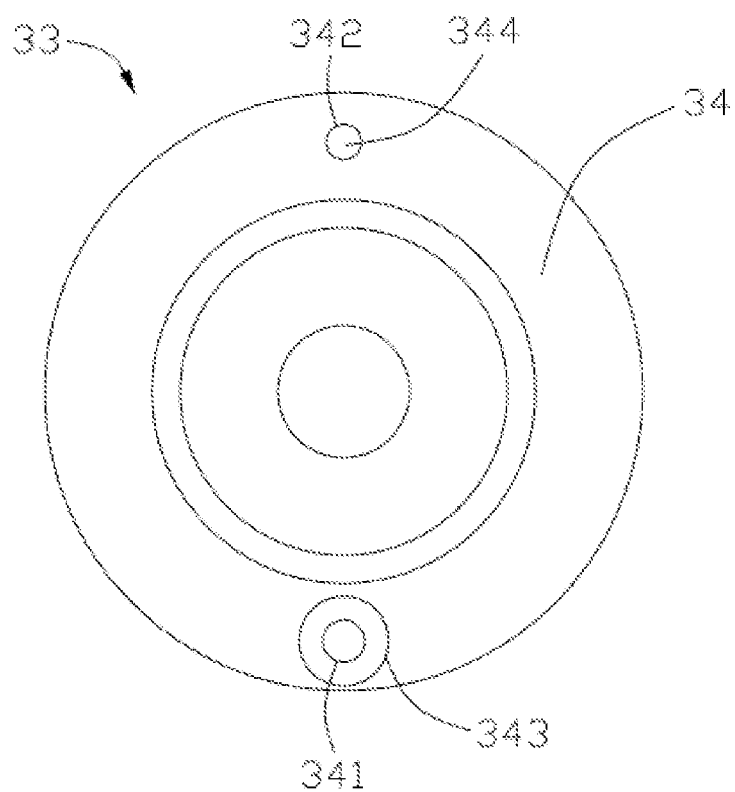
FIG. 6 is a schematic structural view of a switch wheel in the fourth embodiment of the mobile terminal of the present disclosure.

When the structure of the photographing-illumination module 80 is similar to that of FIG. 6, the photographing-illumination module 80 includes a camera, a flash lamp, a laser lamp and a switch wheel. The camera is located at the center of the switch wheel. The flash lamp and the laser lamp are located on the two sides of the camera and can be aligned with the flash lens and the laser lens or laser transmission hole provided in the circumferential direction of the switch wheel. In the present embodiment, the switch wheel is configured as nonrotatable. The laser lens can be a normal planar lens. The flash lens may be a normal telescopic zoom lens, which can change the divergence or convergence effect of the zoom lens on the light of the flash lamp by adjusting the distance between the lens and the flash lamp through the expansion and contraction of the lens barrel, so that the flash lamp can be used as a normal flash and can also be used as a flashlight with adjustable irradiation distance. When the photographing-illumination module 80 is used as a laser pointer, the mobile terminal may be configured to have a function such as a laser pointer, a page-turning laser pointer, and/or a distance-measuring device.

It is to be noted that in the embodiment in which the bottom surface of the terminal body 40 is provided with the photographing-illumination module 80, the front surface of the terminal body 40 may not be provided with the camera 46 and the operation such as recording and photographing is performed by the camera in the photographing-illumination module 80. When recording or photographing is performed by the camera in the photographing-illumination module 80, the captured image can also be displayed by the flexible display screen 43.

Further, the front surface of the flexible display screen 43 is provided with a touch sensing layer 432, and the back surface of the flexible display screen 43 is also provide with a touch sensing layer. The control unit is further configured to activate the corresponding touch sensing layer according to the specific gesture input on the different touch sensing layers. The specific gestures may include short (or tap) touch, long touch, multi touch, drag touch, flick touch, pinch and shrink touch, pinch and release touch, brush touch, hover touch, etc. The control unit may also be further configured to automatically activate the corresponding touch sensing layer according to a function of a specific element (e.g., camera 46) within the mobile terminal. The control unit is further configured to cause the control priority in which the corresponding touch sensing layer is automatically activated by a function of a specific element to be higher than the control priority in which the corresponding touch sensing layer is activated by a gesture. For example, the system can automatically activate the touch sensitive layer on the back surface of the flexible display screen 43 when using the front camera 46 for photographing; or, the system can automatically activate the touch sensing layer 432 on the front surface of the flexible display screen 43 when using the front camera 46 for video call. It is to be understood that in other embodiments of the present disclosure, the control unit may be further configured to activate the touch sensitive layer 432 on the front surface of the flexible display screen 43 by default, and only activate the touch sensing layer on the back surface of the flexible display screen 43 and simultaneously deactivate the touch sensing layer 432 on the front surface of the flexible display screen 43 when the activation signal from the back surface of the flexible display screen 43 is received. The activation signal from the back surface of the flexible display screen 43 may be a gesture signal input by the user or an activation signal automatically issued by the system.

Further, in the embodiment in which the bottom surface of the terminal body 40 is not provided with the photographing-illumination module 80, the top surface of the terminal body 40 or the back top end of the terminal body 40 may be provided with the flash lamp 12 and/or the laser lamp 14. A zoom lens 13 is provided on the flash lamp 12. A zoom lens 13 is not provided on the laser lamp 14 or a planar lens is provided on the laser lamp 14. The zoom lens 13 and the planar lens can be directly fixed behind of the flash lamp 12 and the laser lamp 14 in the light transmission direction of the flash lamp 12 and the laser lamp 14 respectively, or different lenses may be aligned with the flash lamp 12 and the laser lamp 14 by rotating the switch wheel (the structure of the switch wheel has been described in detail in the fourth embodiment, and no redundant detail is to be given herein). Therefore, the flash lamp 12 can be used as a normal flash or as a flashlight with adjustable irradiation distance, and the laser lamp 14, in conjunction with the functional setting of the control unit, can be used as a normal laser pointer or as a page-turning laser pointer or as a light source for distance measurement.

Of course, the flash lamp 12 may not be provided with a zoom lens 13 in other embodiments of the present disclosure. The lens having a different focal length is aligned with the flash lamp 12 by rotating the switch wheel (the specific structure of the switch wheel has been described in detail in the third embodiment, and no redundant detail is to be given herein) so that the flash lamp 12 can be used as a normal flash or as a flashlight with adjustable irradiation distance. Further, by making the corresponding lens have a specific color (e.g., red) and in conjunction with the function setting of the control unit, the flash lamp 12 can be used as a normal laser pointer, a page-turning laser pointer or a light source for distance measurement. The laser lamp 14 may not be provided on the terminal body 40 when the flash lamp 12 is used as a laser pointer, a page-turning laser pointer or a light source for distance measurement.

Further, when the flexible display screen 43 is completely rolled into the terminal body 40, the control unit may be configured to control the display screen 42 to display a function that does not require a large image display area, such as time, weather, call information, system network status, signal strength, system remaining power or the icons of photographing, flashlight, laser pointer, page-turning laser pointer, distance measuring and the icons in the corresponding control page. Thus, the convenience of the mobile terminal can be increased by answering a call, performing a simple functional operation, getting system information such as time, weather, etc. without having to pull out the flexible display screen 43.

Specifically, referring to FIG. 7, when the mobile terminal of the present disclosure is used as a distance-measuring device, a distance-measuring icon 47 is displayed on the display screen 42. The distance-measuring icon 47 shows a scale made according to the correspondence between the distance between the bright spot and the image center and the distance between the object and the camera 46. The user can directly read the distance between the object and the camera 46 according to the distance between the bright spot and the image center displayed in the distance-measuring icon 47.

Figure 13:
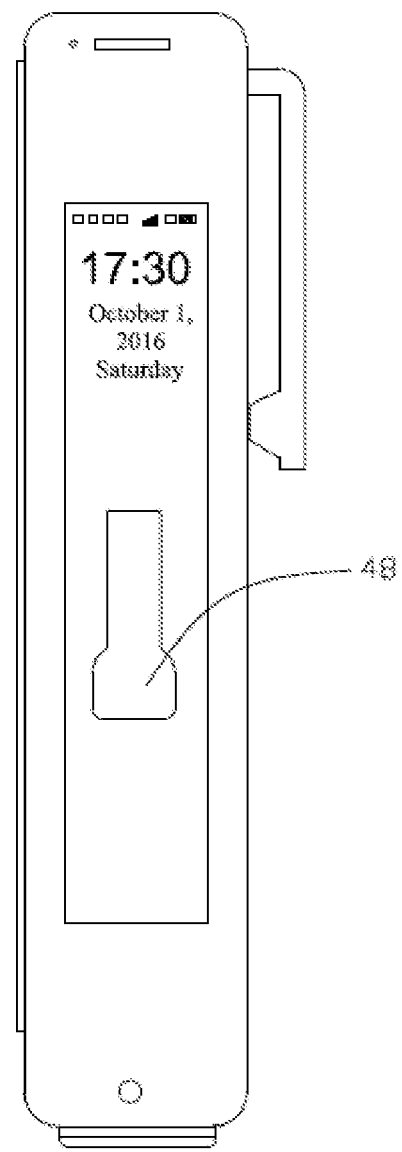
FIG. 13 is a schematic view of a mobile terminal according to the fifth embodiment of the present disclosure when used as a flashlight.

As shown in FIG. 13, when the mobile terminal of the present disclosure is used as a flashlight, a flashlight icon 48 is displayed on the display screen 42. The flashlight icon 48 shows a far light mode and a near light mode. For example, the tail part of the flashlight indicates the far high mode and the head part indicates the near light mode, or the tail part of the flashlight indicates the far high mode, the middle part indicates the near light mode and the head part indicates a laser pointer mode. The user can touch the different parts of the flashlight icon 48 as to adjust the irradiation mode of the flashlight.

Figure 14:
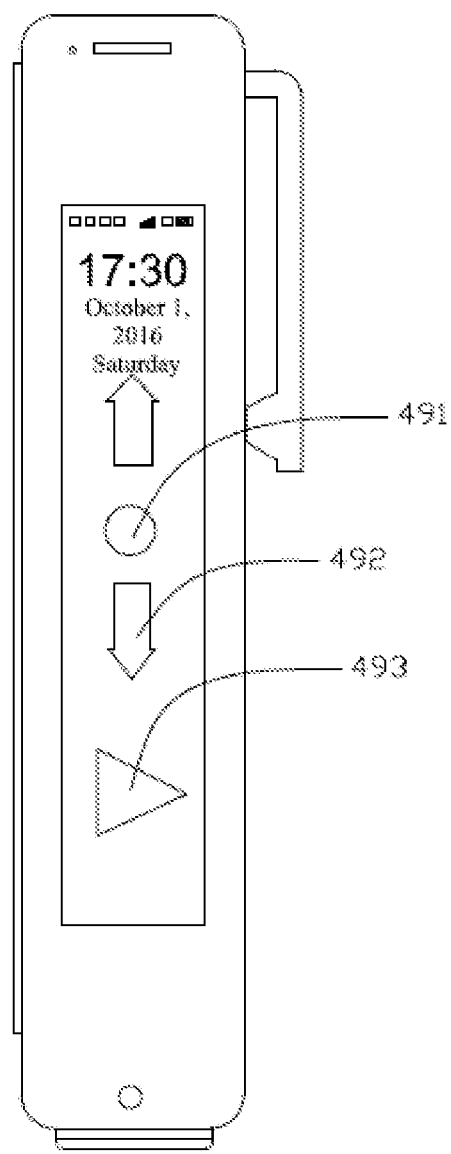
FIG. 14 is a schematic view of a mobile terminal according to the fifth embodiment of the present disclosure when used as a page-turning pointer.

As shown in FIG. 14, when the mobile terminal of the present disclosure is used as a page-turning laser pointer, a laser pointer icon 491, a page-turning icon 492 and a projection icon 493 are displayed on the display screen 42. The user can operate the presentation document by touching different icons according to the need.

In summary, the mobile terminal of the present embodiment adopts a more portable pen-like structure and provides a flexible display screen 43 inside the pen-like structure to increase the portability of the mobile terminal without affecting the display effect. Further, since the flexible display screen 43 adopts a stepless position, images with a plurality of sizes can be displayed to satisfy the user's diversified demands. In addition, the mobile terminal of the present embodiment can adjust the display direction of the image on the flexible display screen 43 when the camera 46 is used as a different function by the system setting, and is more user-friendly for the user to view the image. Since the two functions can be realized with the same camera 46, the number of the cameras 46 in the mobile terminal can be reduced and accordingly the cost of the mobile terminal can be reduced. Further, the mobile terminal of the present embodiment can perform the function of photographing, flashlight, laser pointer, page-turning laser pointer, distance measuring, answering phone, checking time and weather without pulling out the flexible display screen 43, thereby increasing the operation convenience of the mobile terminal.

Sixth Embodiment

Figure 15:
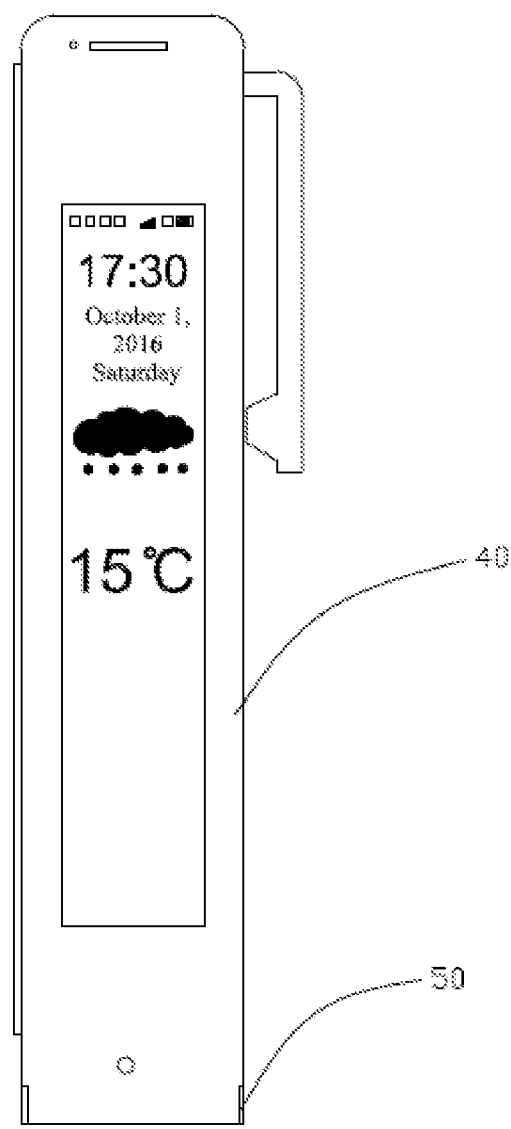
FIG. 15 is a schematic front structural view of a sixth embodiment of the mobile terminal of the present disclosure.
Figure 17:
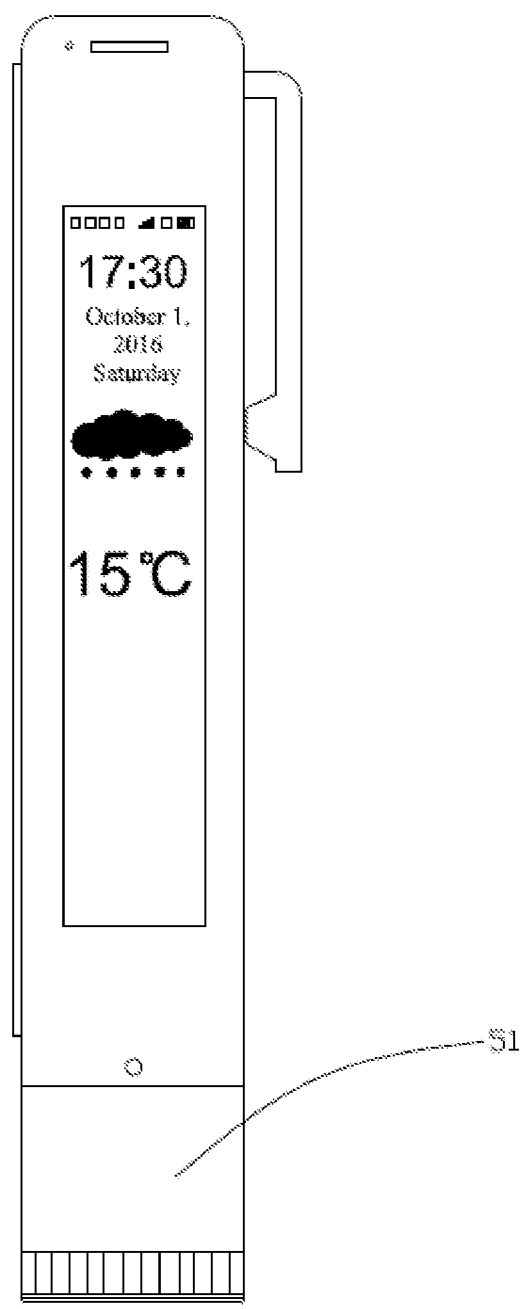
FIG. 17 is a schematic view of a mobile terminal connected with an external zoom lens according to the sixth embodiment of the present disclosure.
Figure 18:
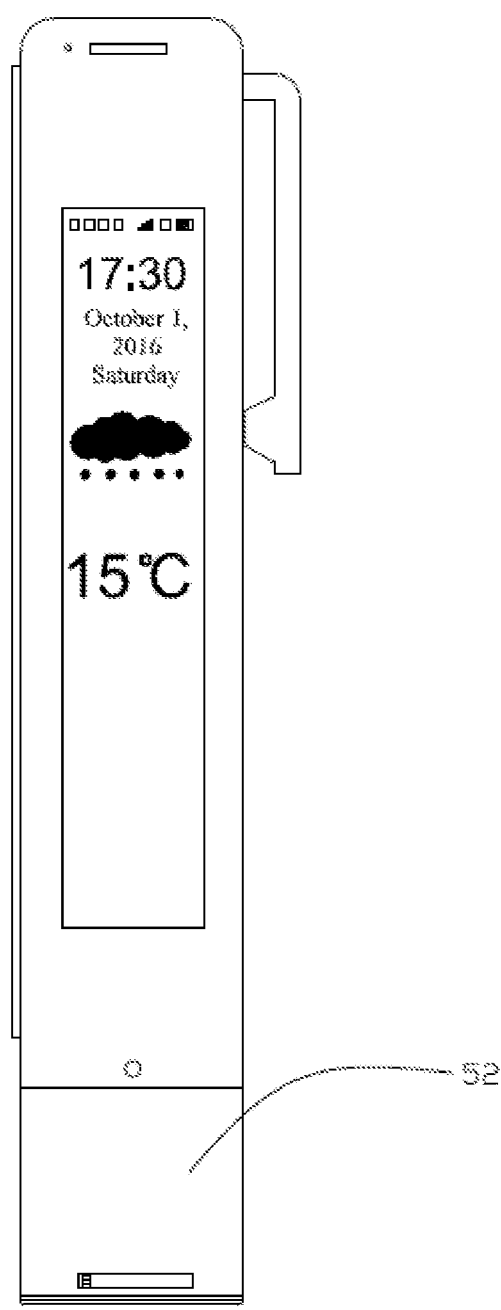
FIG. 18 is a schematic view of a mobile terminal connected with an external projector according to the sixth embodiment of the present disclosure.
Figure 19:
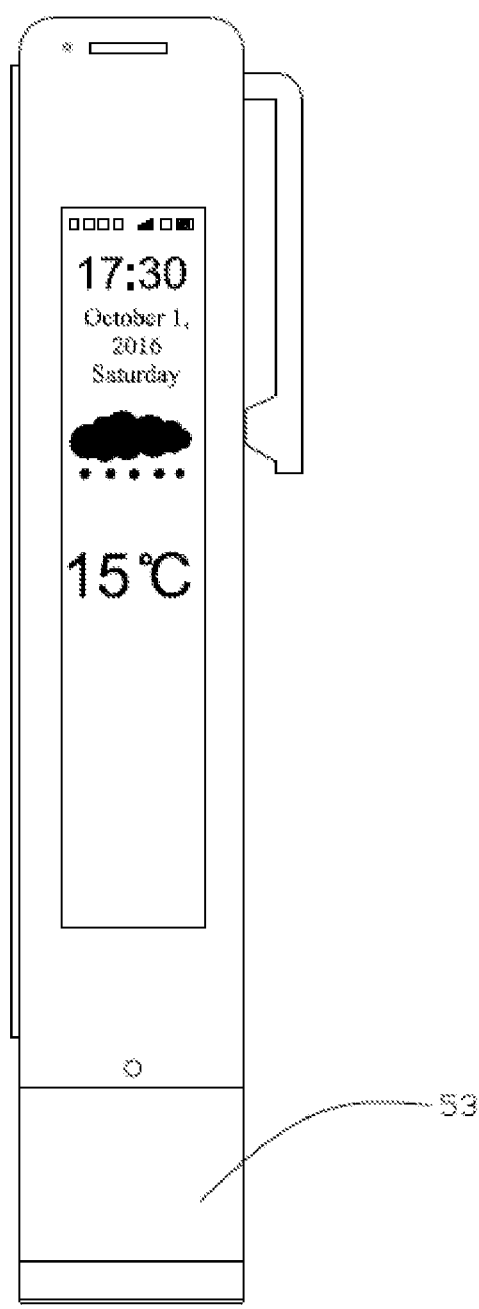
FIG. 19 is a schematic view of a mobile terminal connected with an external flashing according to the sixth embodiment of the present disclosure.
Figure 20:
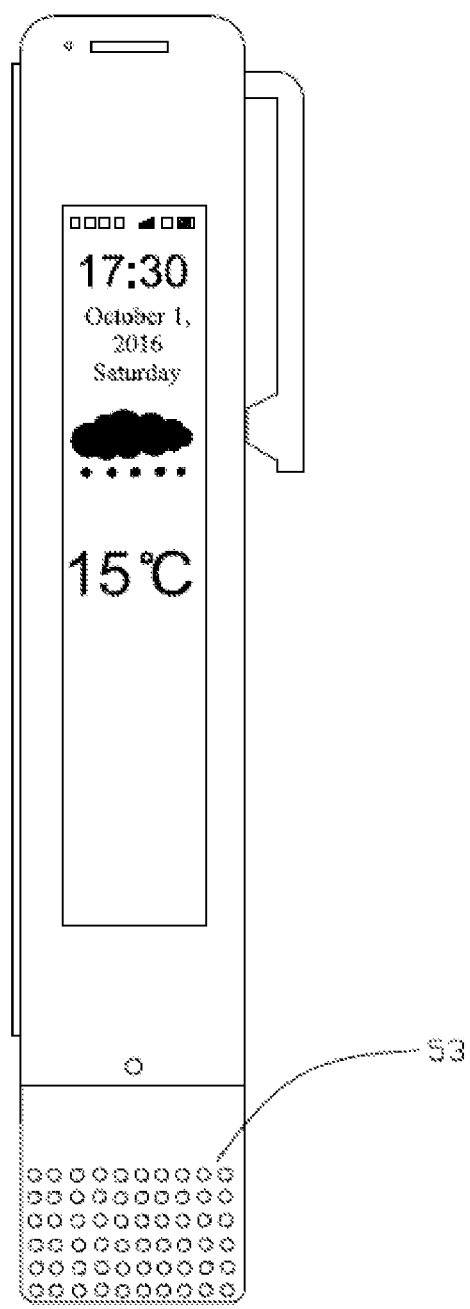
FIG. 20 is a schematic view of a mobile terminal connected with an external speaker or microphone according to the sixth embodiment of the present disclosure.

FIG. 15 is a schematic structural view of a sixth embodiment of the mobile terminal of the present disclosure. As shown in FIG. 15, the mobile terminal of the sixth embodiment is substantially the same as the mobile terminal of the fifth embodiment and is different in that the bottom surface of the mobile terminal of the sixth embodiment is not provided with the photographing-illumination module 80 but is provided with a data-power supply interface 50. The data-power supply interface 50 is for connecting an external device such as a zoom lens 51 (see FIG. 17), a projector 52 (see FIG. 18), a distance-measuring device, a battery, a flashlight 53 (see FIG. 19), a laser pointer, a speaker or a microphone 54 (see FIG. 20).

Figure 16:
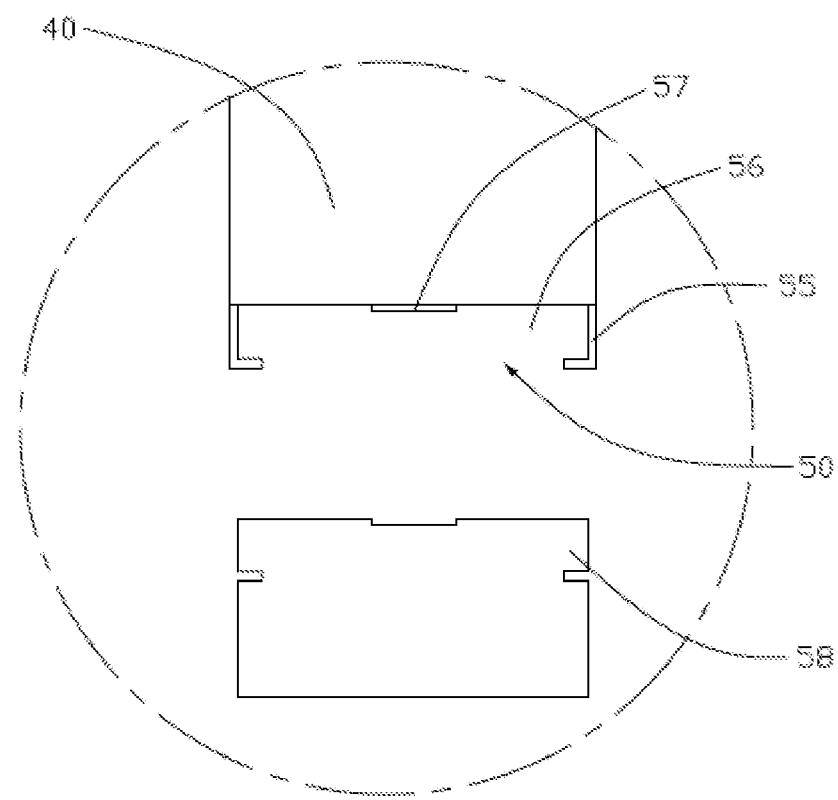
FIG. 16 is a partially enlarged schematic view of a side structure of the sixth embodiment of the mobile terminal of the present disclosure.

As shown in FIG. 16, the data-power supply interface 50 is a clip slot formed at the bottom of the mobile terminal. The data-power supply interface 50 includes two L-shaped clip sheets 55 which are connected to the bottom of the mobile terminal and are disposed opposite to each other. The two clip sheets 55 extend in the width direction or the length direction of the bottom surface of the mobile terminal, and one end of the two clip sheets 55 in the length direction is provided with a shutter (not shown). An accommodating portion 56 is formed between the two clip sheets 55 and the bottom of the mobile terminal. The top portion of the accommodating portion 56 (i.e., the bottom surface of the mobile terminal) is provided with a connection terminal 57 which can be engaged with the connection terminal of the external device. An opening is formed between the horizontal portions of the two clip sheets 55. An external device connected to the mobile terminal is provided with a clip block 58 engaged with the clip slot. When the external device is needed to be connected, it is only necessary to slide the clip block 58 on the external device into the data-power supply interface 50 from one end of the clip sheets 55 without the shutter. When the clip block 58 of the external device is just abutted against the shutter of the data-power supply interface 50 of the mobile terminal, the connection terminal of the external device is engaged with the connection terminal 57 of the mobile terminal, thereby realizing the power and/or data transmission between the external device and the mobile terminal. And due to the engagement of the clip block 58 of the external device and the clip slot of the mobile terminal, the connection between the external device and the mobile terminal is relatively stable and the external device is not easy to be disengaged from the mobile terminal. It is to be understood that the number of connection terminals in the mobile terminal of the present disclosure is not limited to one, and the mobile terminal may be provided with a plurality of different connection terminals for different external devices. The configuration of the data-power supply interface 50 in the present embodiment is not limited to the above configuration. For example, the data-power supply interface 50 of the mobile terminal may include a screw hole provided at the bottom of the mobile terminal and a first connection terminal provided at the screw root of the screw hole, and the data-power supply interface of the external device may include a stud that mates with the screw hole and a second connection terminal provided at the screw top of the stud. In this way, when the stud of the external device is screwed into the screw hole of the mobile terminal, the second connection terminal of the external device may be connected to the first connection terminal of the mobile terminal, thereby realizing the power and/or data transmission of the external device and the mobile terminal. Further, because the screw connection is relatively stable, and thus the external device is not easy to be disengaged from the mobile terminal. For example, the data-power supply interface 50 of the mobile terminal may include a first magnet and a first connection terminal provided at the bottom of the mobile terminal, and the data-power supply interface of the external device may include a second magnet that can be attracted to the first magnet and a second connection terminal which can be engaged with the first connection terminal. In addition, in order to facilitate the positioning accuracy when the mobile terminal and the external device are engaged to each other, a recess may be provided at the bottom of the mobile terminal and a protrusion may be provided on the external device; thus, the second connection terminal may be just connected to the first connection terminal when the protrusion is just sucked into the recess.

When an external device connected to the mobile terminal is to be used, the external device can be controlled by the corresponding key operation on the external device to issue a connection request to the mobile terminal via the data-power supply interface 50 or automatically issues a connection request to the mobile terminal after the connection is established, wherein the connection request is for requesting for a connection with the corresponding module in the mobile terminal. The control unit of the mobile terminal may be configured to issue confirmation information to the user according to the connection request to confirm whether or not it is necessary to connect the external device, and issue a connection signal to the corresponding control module after the user has confirmed it or directly issue the connection signal to the corresponding control module in response to the connection request, thereby allowing the control module to be connected with the external device. When the signal connection between the external device and the mobile terminal is established, the corresponding control on the external device can be performed through the mobile terminal. For example, when the mobile terminal and the projector establish a signal connection, the display screen of the mobile terminal can display the currently-connected external projector and the user is asked to confirm whether or not a connection to the projector is required. When the user confirms, the display screen displays the corresponding control keys, for example, power key, menu keys, screen adjustment keys of the projector so that the user can perform the corresponding operation on the projector through the mobile terminal. It should be noted that in the present embodiment, the control module in the mobile terminal may be a control module set in advance in the mobile terminal or may be a control module newly added in the mobile terminal by installing an application (APP).

In summary, in the present embodiment, the mobile terminal of the present disclosure can be connected to an external device through the setting of the data-power supply interface 50, thereby further expanding the function of the mobile terminal of the present disclosure.

Seventh Embodiment

Figure 21:
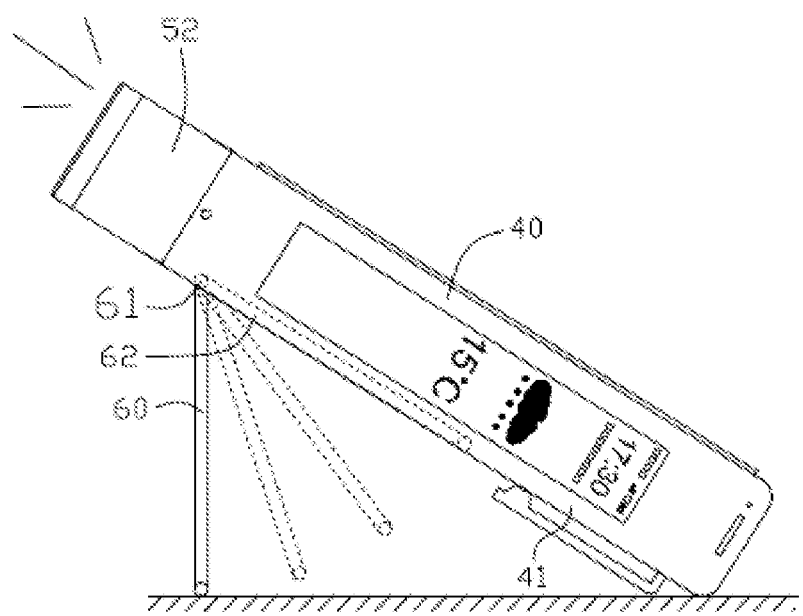
FIG. 21 is a schematic structural view of a seventh embodiment of the mobile terminal of the present disclosure.

FIG. 21 is a schematic structural view of a seventh embodiment of the mobile terminal of the present disclosure. The mobile terminal of the seventh embodiment is substantially the same as the mobile terminal of the sixth embodiment and is different in that the mobile terminal of the present embodiment is provided with a support body 60. The support body 60 is located on one side of the terminal body 40 provided with the clip 41 and is adjacent to the bottom of the terminal body 40. The support body 60 is fixed to the terminal body 40 by a pivot shaft 61. The pivot shaft 61 is perpendicular to the front surface of the terminal body 40 so that the support body 60 is rotatable in a direction parallel to the display screen of the terminal body 40 and can be positioned at any position in a stepless manner. Thus, when the mobile terminal is externally connected with a projector 52 or a flashlight 53, the irradiation direction of the projector 52 or the flashlight 53 can be adjusted by adjusting the angle between the support body 60 and the terminal body 40. In addition, in order to facilitate the accommodation of the support body 60, the corresponding side of the terminal body 40 is provided with an accommodating groove 62 which matches the shape of the support body 60. Further, in order to further increase the support stability of the support body 60, the bottom of the support body 60 may be further provided with a support plate (not shown). The support plate may be disc-shaped or rectangular and its area is larger than the cross-sectional area of the support body 60, so that the contact area between the support body 60 and the table top can be increased and accordingly the support stability can be increased.

Eighth Embodiment

Figure 22:
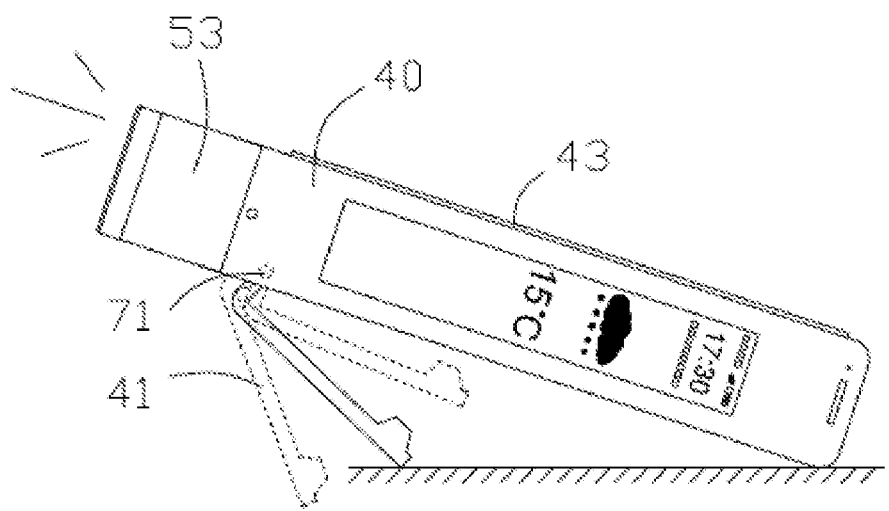
FIG. 22 is a schematic structural view of an eighth embodiment of the mobile terminal of the present disclosure.

FIG. 22 is a schematic structural view of an eighth embodiment of the mobile terminal of the present disclosure. The mobile terminal of the eighth embodiment is substantially the same as the mobile terminal of the seventh embodiment and is different in that the mobile terminal of the present embodiment is not provided with an additional support body but the clip 41 is served as the support body. In the present embodiment, the position of the clip 41 is changed to a position adjacent to the bottom of the terminal body 40. The clip 41 is fixed to the terminal body 40 by a pivot shaft 71. The pivot shaft 71 is perpendicular to the front surface of the terminal body 40 so that the clip 41 is rotatable in a direction parallel to the display screen of the terminal body 40 and can be positioned at any position in a stepless manner. Thus, when the mobile terminal is externally connected with a projector 52 or a flashlight 53, the irradiation direction of the projector 52 or the flashlight 53 can be adjusted by adjusting the angle between the clip 41 and the terminal body 40.

Of course, in other embodiments of the present disclosure, the position of the clip 41 may not be changed. By disposing the data-power supply interface 50 on the top surface of the terminal body 40, the clip 41 can also be used as a support body and used for the adjustment of the irradiation direction of the projector 52 or the flashlight 53.

Figure 23:
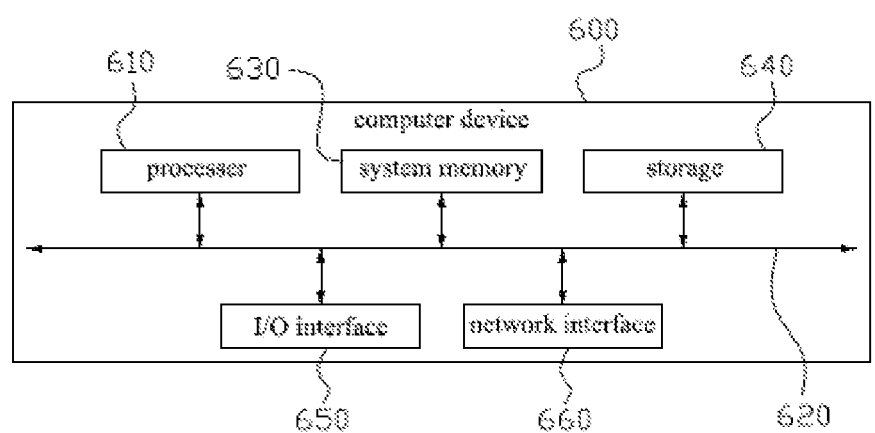
FIG. 23 is a diagram illustrating an example computing system that may be used in one embodiment of the present invention.

FIG. 23 is a diagram illustrating an example computing system that may be used in one embodiment of the present invention. Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In at least some embodiments, a server or computing device that implements a portion or all of one or more of the technologies described herein, including the techniques to implement the functionality of mobile terminal, may include a general-purpose computer system that includes or is configured to access one or more computer-accessible media. FIG. 23 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be

What is claimed is:

1. A mobile terminal, comprising a terminal body and a control unit, wherein a side of the terminal body is provided with an elongated opening, an inside of the terminal body is rollingly provided with a flexible display screen, the flexible display screen is able to be pulled out the terminal body via the elongated opening, the control unit controls the flexible display screen to display an image;

wherein the mobile terminal further comprises a sensing unit, the sensing unit comprises a deformation sensing unit, and the deformation sensing unit senses deformation information of different parts of the flexible display screen and determines a length of a pulled-out part of the flexible display screen according to a change of the deformation information of the flexible display screen, wherein the control unit is further configured to automatically calculate a size of the image that the flexible display screen display based on the length of the pulled-out part of the flexible display screen and accordingly adjust a display ratio of the image displayed on the flexible display screen;

an other side of the terminal body is provided with a transparent display screen, the elongated opening is set on an adjacent side of the transparent display screen, the transparent display screen of the terminal body is provided with a polymer dispersion liquid crystal layer, the polymer dispersion liquid crystal layer is configured to change its transparency by changing the electrical signal applied thereto, wherein the control unit is further configured to control the polymer dispersion liquid crystal layer to turn the transparent display screen into opacity when the flexible display screen is pulled out the terminal body.

2. The mobile terminal according to claim 1, wherein the mobile terminal is a pen-like structure.

3. The mobile terminal according to claim 1, wherein the flexible display screen is able to be positioned at any position in a stepless manner.

4. The mobile terminal according to claim 1, wherein a free end of the flexible display screen is provided with a long barrier strip, a length of the barrier strip is greater than a length of the elongated opening.

5. The mobile terminal according to claim 1, wherein a front surface of the terminal body is provided with a camera, wherein the control unit is further configured to control the flexible display screen to normally display an image captured by the camera, and when the camera is used for photographing, the control unit is further configured to control the flexible display screen to invertly display the image captured by the camera; or a back surface of the terminal body is provided with a camera, wherein the control unit is further configured to control the flexible display screen to normally display an image captured by the camera, and when the camera is used for photographing, the control unit is further configured to control the flexible display screen to invertly display the image captured by the camera.

6. The mobile terminal according to claim 1, wherein a bottom surface of the terminal body is provided with a photographing-illumination module, the photographing-illumination module comprises a camera, a flash lamp and a switch wheel, the camera is located in a center of the switch wheel, and the flash lamp is located on a side of the camera and is able to be aligned with flash lenses provided in the circumferential direction of the switch wheel.

7. The mobile terminal according to claim 6, wherein the flash lenses comprise colorless lenses and color lenses, wherein by rotating the switch wheel, the flash lamp is configured to be engaged with different flash lenses so that the flash lamp is able to be used as a normal flash or as a flashlight or as a laser pointer.

8. The mobile terminal according to claim 6, wherein the flash lenses are telescopic zoom lenses, and each of the telescopic zoom lens changes the divergence or convergence effect of the flash lens on the light of the flash lamp through an expansion and contraction of a lens barrel, so that the flash lamp is able to be used as a normal flash and is also able to be used as a flashlight with adjustable irradiation distance.

9. The mobile terminal according to claim 6, wherein the photographing-illumination module comprises a laser lamp, the laser lamp is located on a side of the camera and is configured to be aligned with the flash lenses or a flash transmission hole provided in the circumferential direction of the switch wheel, the control unit is further configured to control the laser lamp to emit light and control the camera to capture an image of an illuminated object, and calculate distance between the camera and the illuminated object according to distance between a bright spot and an image center in a captured image.

10. The mobile terminal according to claim 1, wherein a front surface and a back surface of the flexible display screen are both provided with a touch sensing layer, wherein the control unit is further configured to activate a corresponding touch sensing layer according to different control signals, the different control signals comprises control signals generated according to a specific gesture input on different touch sensing layers and/or control signals generated according to an operation of a function of a specific element within the mobile terminal.

11. The mobile terminal according to claim 10, wherein when the different control signals comprises the control signals generated according to the specific gesture input on the different touch sensing layers and the control signals generated according to the function of the specific element within the mobile terminal, a control priority of the control signals generated according to the operation of the function of the specific element within the mobile terminal is higher than the control signals generated according to the specific gesture input on the different touch sensing layers.

12. The mobile terminal according to claim 1, wherein a front surface of the flexible display screen and a back surface of the flexible display screen are both provided with a touch sensing layer, the control unit is further configured to activate the touch sensitive layer on the front surface of the flexible display screen by default, and activate the touch sensing layer on the back surface of the flexible display screen and simultaneously deactivate the touch sensing layer on the front surface of the flexible display screen when an activation signal from the back surface of the flexible display screen is received.

13. The mobile terminal according to claim 1, wherein the control unit is further configured to control the transparent display screen to display function or information that does not require a large image display area when the flexible display screen is completely rolled into the terminal body.

14. The mobile terminal according to claim 13, wherein a front surface of the display screen is provided with a touch sensing layer, wherein the control unit is further configured to control the mobile terminal to perform corresponding operation according to a specific gesture input on the touch sensing layer of the front surface of the display screen.

15. The mobile terminal according to claim 1, wherein a top surface or a bottom surface of the mobile terminal is provided with a data-power supply interface, the data-power supply interface is for connecting an external device.

16. The mobile terminal according to claim 15, wherein the mobile terminal and the external device are connected in a clip connection, a magnetic force or a screw connection manner.

17. The mobile terminal according to claim 15, wherein the control unit is further configured to issue confirmation information to a user according to a connection request issued by the external device to confirm whether or not it is necessary to connect the external device and to issue a connection signal to a corresponding control module after the user confirms or to directly issue the connection signal to the corresponding control module in response to the connection request, thereby allowing the control module to be connected to the external device.

18. The mobile terminal according to claim 15, wherein a support body rotatable relative to the mobile terminal is provided at a position on a side surface of the mobile terminal and adjacent to the data-power supply interface, and the support body is fixed to the mobile terminal by a pivot shaft and is able to be positioned at any angle in a stepless manner.

* * * * *